US012657771B2

(12) United States Patent (10) Patent No.: US 12,657,771 B2

Kounosu (45) Date of Patent: Jun. 16, 2026

(54) IMAGE PROCESSING DEVICE AND COMPUTER-READABLE STORAGE MEDIUM

(71) Applicant: FANUC CORPORATION, Yamanashi (JP)

(72) Inventor: Yuuji Kounosu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 18/579,500

(22) PCT Filed: Jul. 26, 2021

(86) PCT No.: PCT/JP2021/027559

§ 371 (c)(1),
(2) Date: Jan. 16, 2024

(87) PCT Pub. No.: WO2023/007551

PCT Pub. Date: Feb. 2, 2023

(65) Prior Publication Data

US 2024/0320859 A1 Sep. 26, 2024

(51) Int. Cl.
*G06T 7/73* (2017.01)

(52) U.S. Cl.
CPC ...... *G06T 7/75* (2017.01); *G06T 2207/20076* (2013.01); *G06T 2207/20084* (2013.01); *G06T 2207/30164* (2013.01)

(58) Field of Classification Search
CPC ............. G06T 7/75; G06T 2207/20076; G06T 2207/20084; G06T 2207/30164; G06T 2207/20081; G06T 7/73
See application file for complete search history.

(56) References Cited

U.S. PATENT DOCUMENTS

| | | | | |
|---|---|---|---|---|
| 10,755,401 B2 * | 8/2020 | Bian | ...................... | G06T 7/0004 |
| 11,314,986 B2 * | 4/2022 | Chae | ........................ | G06N 3/09 |
| 2021/0027491 A1 | 1/2021 | Satou | | |
| 2021/0129318 A1 | 5/2021 | Namiki | | |

FOREIGN PATENT DOCUMENTS

| | | |
|---|---|---|
| JP | 2016-078180 A | 5/2016 |
| JP | 2018-202550 A | 12/2018 |
| JP | 2019-106193 A | 6/2019 |
| JP | 2021-005301 A | 1/2021 |
| JP | 2021-018662 A | 2/2021 |
| JP | 2021-071878 A | 5/2021 |

* cited by examiner

*Primary Examiner* — Phuoc Tran
(74) *Attorney, Agent, or Firm* — HAUPTMAN HAM, LLP

(57) ABSTRACT

An image processing device includes: a model storage unit storing a model for estimating, from image data, a first probability map indicating feature points of a workpiece in the image data, and a second probability map indicating areas between the feature points; an estimation unit estimating a first probability map and a second probability map on the basis of the image data using the model stored in the model storage unit; a feature point estimation unit estimating feature points of the same workpiece in the image data on the basis of the first probability map and the second probability map; a position and orientation estimation unit estimating the position and orientation of the workpiece in the image data on the basis of the result of the estimation by the feature point estimation unit; and an output unit outputting the result of the estimation by the position and orientation estimation unit.

4 Claims, 13 Drawing Sheets

FIG. 3

IMAGE OF WORKPIECES

ESTIMATION RESULTS OF REGION
BETWEEN FEATURE POINTS A1 AND A2

ESTIMATION RESULTS OF FEATURE
POINT A1

ESTIMATION RESULTS OF REGION
BETWEEN FEATURE POINTS A2 AND A3

ESTIMATION RESULTS OF FEATURE
POINT A2

ESTIMATION RESULTS OF REGION
BETWEEN FEATURE POINTS A2 AND A4

● :FEATURE POINT

▬▬ :REGION BETWEEN FEATURE POINTS

●  :FEATURE POINT

━━━  :REGION BETWEEN FEATURE POINTS

● : FEATURE POINT

▬ : REGION BETWEEN FEATURE POINTS

IMAGE OF WORKPIECES

ESTIMATION RESULTS 1 OF REGION BETWEEN FEATURE POINTS

ESTIMATION RESULTS OF FEATURE POINT A

ESTIMATION RESULTS 2 OF REGION BETWEEN FEATURE POINTS

RECOGNITION

RECOGNITION

| IMAGE OF WORKPIECE |
| --- |

| PROBABILITY MAP 1 INDICATING REGION BETWEEN ADJACENT FEATURE POINTS A |
| --- |

| PROBABILITY MAP INDICATING FEATURE POINT A |
| --- |

| PROBABILITY MAP 2 INDICATING REGION BETWEEN ADJACENT FEATURE POINTS A |
| --- |

| PROBABILITY MAP 1 INDICATING REGION BETWEEN OPPOSING FEATURE POINTS A |
| --- |

⋮

IMAGE PROCESSING DEVICE AND COMPUTER-READABLE STORAGE MEDIUM

RELATED APPLICATIONS

The present application is a National Phase of International Application No. PCT/JP2021/027559 filed Jul. 26, 2021.

TECHNICAL FIELD

The present invention relates to an image processing device and a computer-readable storage medium.

BACKGROUND ART

In the related art, in detection of the position and attitude of a workpiece using computer vision, an individual workpiece is identified from the amount of feature created from the entire workpiece and the contour of the workpiece, and the position and attitude of the workpiece are estimated. For example, Patent Document 1 discloses an invention that workpieces loaded in bulk in a container are picked up by a robot. In this invention, the position and attitude of each workpiece are recognized from three-dimensional information (position data) obtained by imaging the container. At the time of the recognition, a matching process is performed on the basis of data indicating the features of the workpieces which have been registered in advance. Examples of the matching process include CAD matching for matching with CAD data, surface matching for matching between three-dimensional data items, and edge matching for extracting edges and matching the edges.

CITATION LIST

Patent Document

Patent Document 1: JP 2016-078180 A

SUMMARY OF THE INVENTION

Problem to be Solved by the Invention

The recognition of the workpiece may be unstable depending on the state of the workpiece and lighting conditions. For example, it may be difficult to identify individual workpieces after a palletizing operation of loading the workpieces on a pallet. When a plurality of corrugated cardboard boxes are loaded as the workpieces without any gap after the palletizing, two corrugated cardboard boxes may be recognized as one corrugated cardboard box. In addition, when a slip (for example, an invoice or a statement of delivery) or a packing tape is attached to a surface of the corrugated cardboard box, this may adversely affect the estimation of the amount of feature and the contour of the corrugated cardboard box. Further, the corrugated cardboard boxes may not be correctly recognized due to the presence of light and dark within the pallet depending on a lighting position.

FIGS. 9 and 10 illustrate examples of the recognition of the corrugated cardboard boxes after palletizing. FIGS. 9 and 10 illustrate a captured image 301 of an aspect in which corrugated cardboard boxes 305 are loaded on a pallet 302 and a resulting image 310 obtained by recognizing the corrugated cardboard boxes 305 from the image 301. In FIG.

9, a light is properly set for the pallet 302, and there is no light or dark within the pallet 302. In this case, each corrugated cardboard box 305 is relatively stably recognized as a recognized image 312 in the resulting image 310. In contrast, in FIG. 10, the position of the light with respect to the pallet 302 is poor, and a bright portion 308 and a dark portion 309 occur within the pallet. In this case, the recognized image 312 may be recognized at a position where no corrugated cardboard boxes 305 are present, or a plurality of corrugated cardboard boxes 305 may be recognized as one recognized image 312. In addition, one corrugated cardboard box 305 may be recognized as two recognized images 312 at a position where a packing tape is present.

Therefore, even in a case in which it is difficult to recognize a workpiece due to, for example, the state of the workpiece and lighting conditions, there is a demand for a technique that can perform supporting such that the influence of the difficulty in recognition can be suppressed to some extent.

Means for Solving Problem

A controller according to the present disclosure causes a neural network to learn a plurality of "feature points", which are feature points of a workpiece and can specify the position and attitude of the workpiece, and "regions between the feature points" which specify combinations of the feature points. Then, the controller estimates the feature points in an image and the regions between the feature points with the neural network and specifies the positions and attitude of individual workpieces on the basis of the estimation result to solve the above problems.

According to an aspect of the present disclosure, there is provided an image processing device for generating a machine learning model used to estimate a position and attitude of a workpiece from within image data, on the basis of the image data obtained by imaging the workpiece. The image processing device comprises: a data acquisition unit configured to acquire image data obtained by imaging a workpiece; a preprocessing unit configured to create a first probability map indicating feature points of the workpiece in the image data and a second probability map indicating regions between the feature points on the basis of the image data acquired by the data acquisition unit; a learning unit configured to generate a model of machine learning for estimating the first probability map and the second probability map from the image data on the basis of the image data, the first probability map, and the second probability map; and a model storage unit configured to store the model created by the learning unit.

According to another aspect of the present disclosure, there is provided an image processing device for estimating a position and attitude of a workpiece from within image data obtained by imaging the workpiece. The image processing device comprises: a model storage unit configured to store a model for estimating a first probability map indicating feature points of a workpiece in image data obtained by imaging the workpiece and a second probability map indicating regions between the feature points from the image data; a data acquisition unit configured to acquire image data obtained by imaging at least one workpiece; an estimation unit configured to estimate a first probability map and a second probability map, using the model stored in the model storage unit, on the basis of the image data acquired by the data acquisition unit; a feature point estimation unit configured to estimate feature points of the same workpiece in the image data on the basis of the first probability map and the second probability map; a position and attitude estimation unit configured to estimate a position and attitude of the workpiece in the image data on the basis of a result estimated by the feature point estimation unit; and an output unit configured to output a result estimated by the position and attitude estimation unit.

Effect of the Invention

According to an aspect of the present disclosure, even when there are factors, such as the appearance of a workpiece in a captured image being not uniform, the contour of the workpiece being difficult to see, or the misrecognizing of the workpiece being easily occurred, it is possible to expect the recognition of the workpiece to be less affected by these factors.

BRIEF DESCRIPTION OF DRAWINGS

FIG. 3 is a diagram illustrating an example of probability maps indicating feature points and probability maps indicating regions between the feature points;

MODE(S) FOR CARRYING OUT THE INVENTION

Hereinafter, embodiments of the invention will be described with reference to the drawings.

Figure 1:
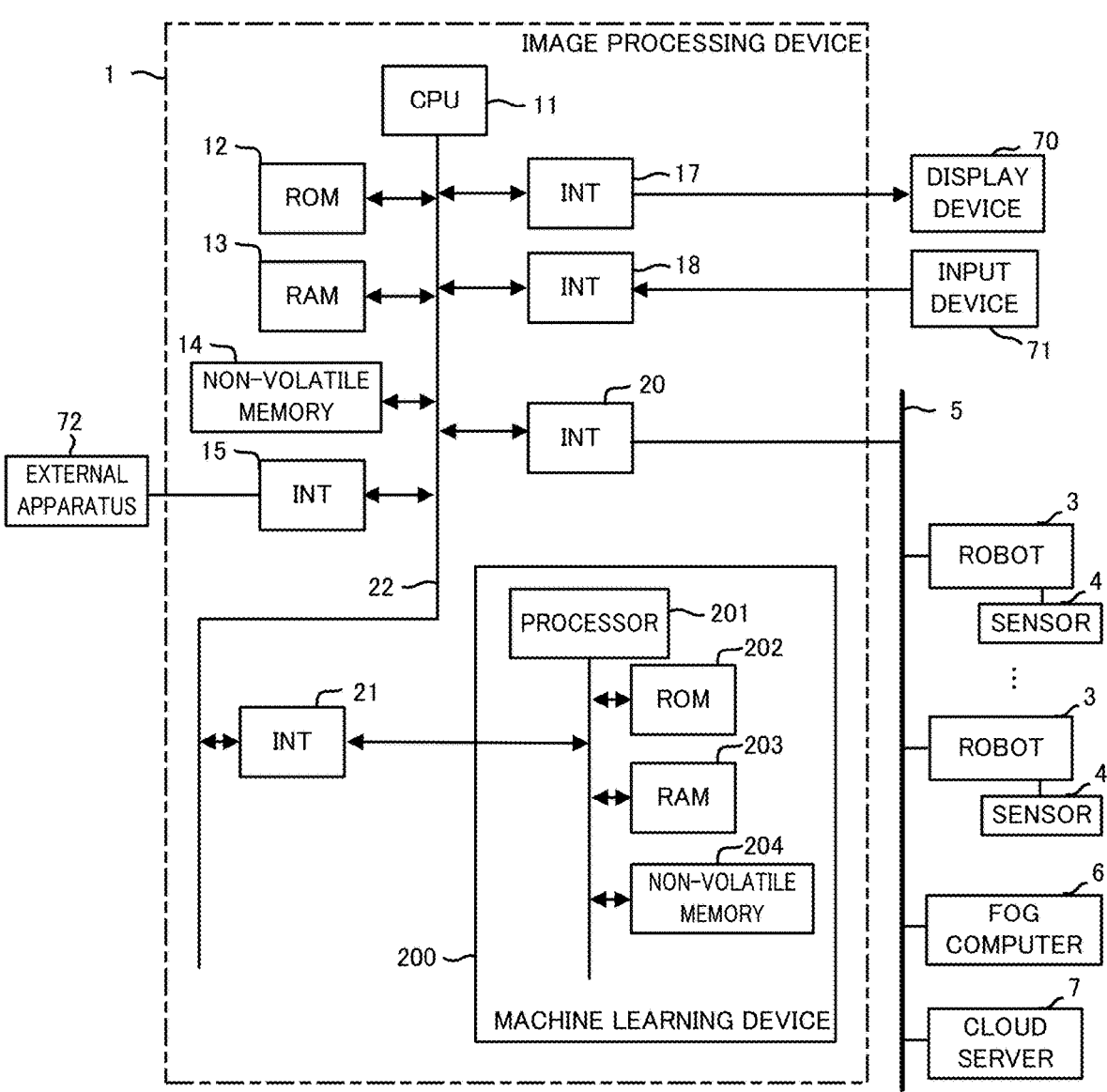
FIG. 1 is a diagram illustrating a schematic hardware configuration of an image processing device according to an embodiment of the invention.

FIG. 1 is a diagram illustrating a schematic hardware configuration of a main part of a diagnostic apparatus according to an embodiment of the invention. An image processing device 1 according to the invention can be implemented, for example, on a robot controller that controls a robot 3 performing a bulk loading operation. In addition, the image processing device 1 according to the invention can be implemented on a personal computer that is attached to the robot 3 performing the bulk loading operation or a computer, such as a personal computer, a cell computer, a fog computer 6, or a cloud server 7, that is connected to the robot 3 through a wired/wireless network. In this embodiment, an example in which the image processing device 1 is implemented on the personal computer that is connected to the robot 3 performing the bulk loading operation through the network will be described.

A CPU 11 included in the image processing device 1 according to this embodiment is a processor that controls the overall operation of the image processing device 1. The CPU 11 reads a system program stored in a ROM 12 through a bus 22 and controls the entire image processing device 1 according to the system program. A RAM 13 temporarily stores, for example, temporary calculation data or display data and various types of data input from the outside.

A non-volatile memory 14 is configured by, for example, a memory or a solid state drive (SSD) that is backed up by a battery (not illustrated), and a storage state of the non-volatile memory 14 is retained even when the image processing device 1 is turned off. For example, data read from an external apparatus 72 through an interface 15, data input through an input device 71, and data obtained from the robot 3 (including image data of a workpiece detected by a sensor 4 which is a visual sensor) are stored in the non-volatile memory 14. The data stored in the non-volatile memory 14 may be expanded in the RAM 13 during execution/use. In addition, various system programs, such as known analysis programs, are written in the ROM 12 in advance.

The sensor 4, such as the visual sensor, that images a workpiece during the bulk loading operation is attached to the robot 3. The robot 3 images the workpiece loaded on a pallet with the sensor 4 in response to an instruction from an operator. Then, the robot 3 transmits image data obtained by the imaging to the image processing device 1 through a network 5.

The interface 15 is an interface for connecting the CPU 11 of the image processing device 1 and the external apparatus 72 such as a USB device. It is possible to read, for example, the image data of a workpiece, which has been stored in advance, from the external apparatus 72. In addition, it is possible to store setting data or the like, which has been edited in the image processing device 1, in an external storage means through the external apparatus 72.

An interface 20 is an interface for connecting the CPU 11 of the image processing device 1 and the wired or wireless network 5. For example, the robot 3, the fog computer 6, and the cloud server 7 are connected to the network 5 to exchange data with the image processing device 1.

For example, each data item read onto the memory, data obtained by executing a program or the like, and data output from a machine learning device 200, which will be described below, are output through an interface 17 and displayed on a display device 70. In addition, the input device 71 that is composed of a keyboard, a pointing device, or the like sends commands, data, or the like based on the operations of the operator to the CPU 11 through an interface 18.

An interface 21 is an interface for connecting the CPU 11 and the machine learning device 200. The machine learning device 200 includes a processor 201 that controls the overall operation of the machine learning device 200, a ROM 202 that stores system programs or the like, a RAM 203 for temporary storage in each process related to machine learning, and a non-volatile memory 204 that is used to store models or the like. The machine learning device 200 can observe each information item (for example, the image data of the workpiece captured by the robot 3) that can be acquired by the image processing device 1 through the interface 21. Further, the image processing device 1 acquires processing results that are output from the machine learning apparatus 200 through the interface 21 and stores the acquired results, displays the acquired results, or transmits the acquired results to other devices through the network 5 or the like.

Figure 2:
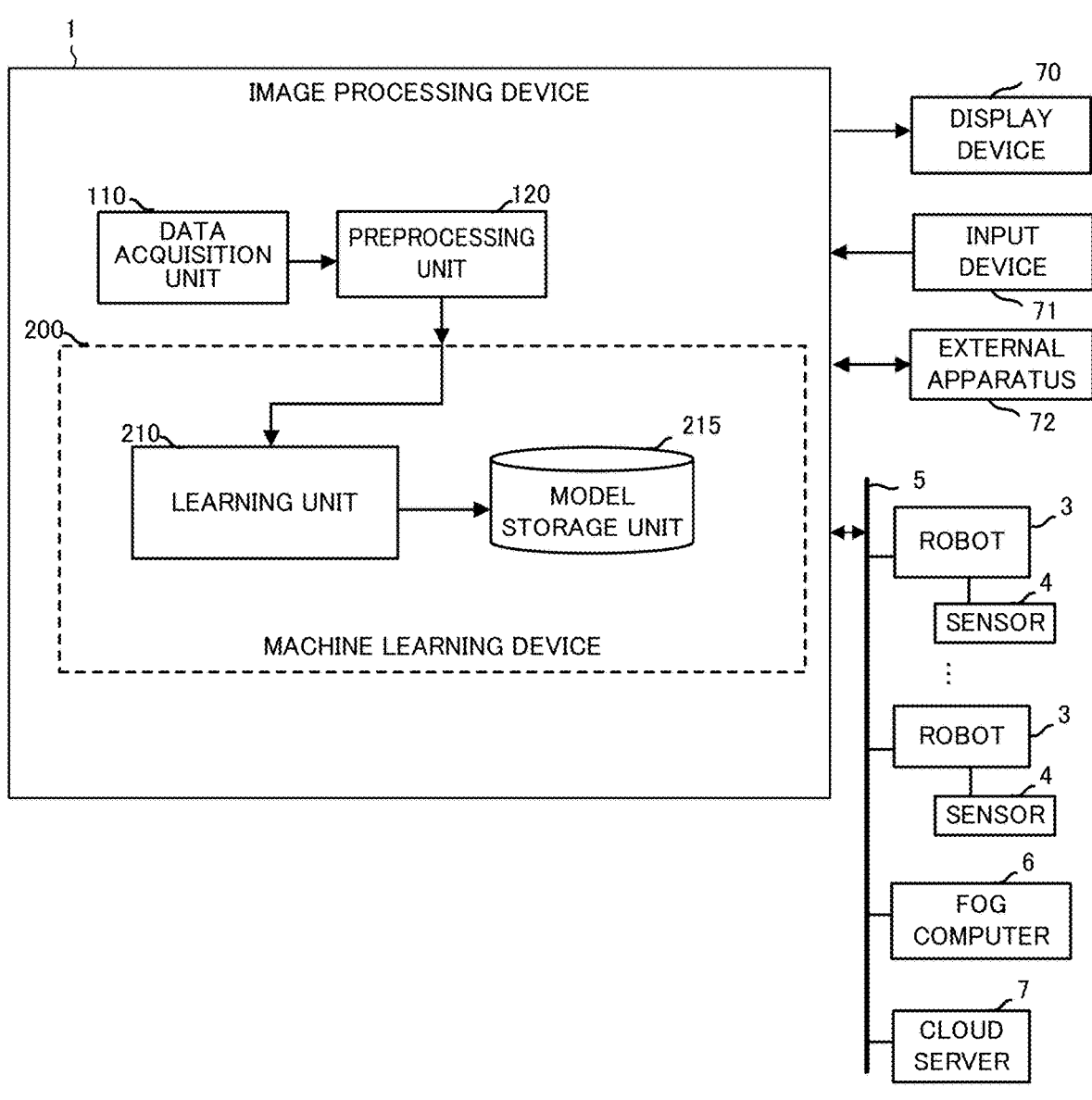
FIG. 2 is a block diagram illustrating schematic functions of an image processing device according to a first embodiment of the invention.

FIG. 2 is a schematic block diagram illustrating the functions of an image processing device 1 according to a first embodiment of the invention. The image processing device 1 according to this embodiment performs machine learning based on an image of a workpiece to create a trained model. The CPU 11 included in the image processing device 1 and the processor 201 included in the machine learning device 200 illustrated in FIG. 1 execute the system program to control the operation of each unit of the image processing device 1 and the machine learning device 200, thereby implementing each function of the image processing device 1 according to this embodiment.

The image processing device 1 according to this embodiment includes a data acquisition unit 110, a preprocessing unit 120, and a learning unit 210. In addition, a model storage unit 215, which is an area storing the trained model that is a model generated as a result of machine learning based on the image data of the workpiece, is secured in advance on the RAM 203 or the non-volatile memory 204 of the machine learning device 200.

The data acquisition unit 110 acquires the image data of the workpiece captured by the sensor 4 of the robot 3. For example, the data acquisition unit 110 may acquire the image data of the workpiece from the robot 3 through the network 5. In addition, the data acquisition unit 110 may acquire the image data of the workpiece captured in advance from the external apparatus 72. The data acquisition unit 110 outputs the acquired image data to the preprocessing unit 120.

The preprocessing unit 120 creates learning data used for learning by the learning unit 210 on the basis of the image data of the workpiece input from the data acquisition unit 110. Then, the created learning data is output to the machine learning device 200. The learning data created by the preprocessing unit 120 includes at least a probability map indicating a plurality of feature points capable of specifying the position and attitude of the workpiece and a probability map indicating regions between the feature points.

The probability map indicating the feature points is image data indicating the probability that each pixel will be located at a position corresponding to the feature point of the workpiece, that is, the probability that each pixel will belong to a class of the feature points. The preprocessing unit 120 may provide an input screen for inputting feature points to the operator and specify feature points on the basis of an input from the operator. In this case, the operator designates a point that will be a feature point in the image displayed on the screen. In addition, the preprocessing unit 120 may extract the feature points of the workpiece in the image data using a known image processing technique. For example, the preprocessing unit 120 may perform image processing for extracting an edge of an image on the image data and set a position where the angle of the extracted edge line is equal to or greater than a predetermined threshold value as the feature point. In addition, the preprocessing unit 120 creates the probability map indicating the feature points by setting the probability such that a high probability is set for a pixel corresponding to the position of the feature point among the pixels included in the image data and a lower probability is set for a pixel that is further away from the position of the feature point. For example, this probability map can be easily created by creating an image in which a pixel corresponding to the specified or extracted feature point is given a predetermined color (for example, white) indicating the highest probability and pixels at the other positions are given a predetermined color (for example, black) indicating the lowest probability and by performing preprocessing, such as Gaussian filtering, on the created image. The probability map created in this way has a form in which probability values spread in a predetermined range having the feature point as the center. This probability map may be created for each feature point.

The probability map indicating the regions between the feature points is image data indicating the probability that the pixel will be located in the region between the feature points, that is, the probability that the pixel will belong to a class of the regions between the feature points. The preprocessing unit 120 creates the probability map indicating the regions between the feature points by setting the probability such that a high probability is set for a pixel, which is located on a straight line connecting the feature points in a feature point set, among the pixels included in the image data and a lower probability is set for a pixel that is further away from the straight line. For example, this probability map can be easily created by creating an image in which a line is drawn in a predetermined color (for example, white) indicating the highest probability between the specified or extracted feature points and pixels at the other positions are given a predetermined color (for example, black) indicating the lowest probability and by performing preprocessing, such as Gaussian filtering, on the created image. The probability map created in this way has a form in which probability values spread in a predetermined range having a line segment connecting the feature points as the center. This probability map may be created for each feature point set. For example, the probability map indicating the regions between the feature points may be created such that a probability map indicating the regions between the feature points at adjacent positions on the contour of the workpiece or a probability map indicating the regions between the feature points at opposing positions on the contour of the workpiece can be distinguished. The probability map indicating the regions between the feature points may be created for all of the feature point sets.

Figure 3:
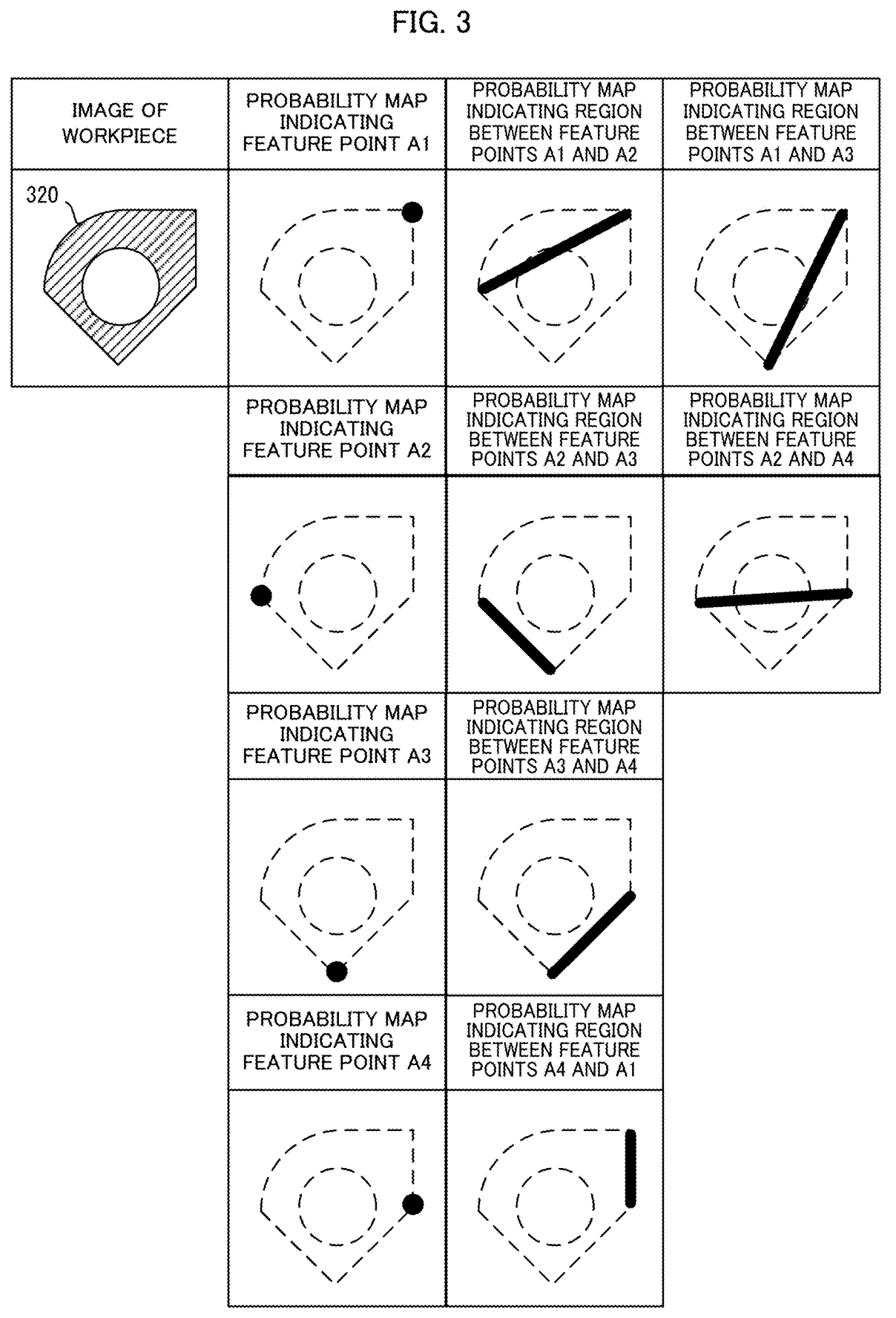

FIG. 3 is a diagram illustrating an example of the probability map indicating the feature points and the probability map indicating the regions between the feature points. As illustrated in FIG. 3, a workpiece 320 has at least four vertices, and the position and attitude of the workpiece can be specified using at least these vertices as the feature points. Therefore, a probability map is created in which feature points A1, A2, A3, and A4 have a high probability of belonging to the class over a predetermined range of pixels which have pixels at positions corresponding to the vertices of the workpiece 320 in the image data as the centers. In addition, a probability map is created in which, for each of combinations [A1, A2], [A2, A3], [A3, A4], [A1, A4], [A1, A3], and [A2, A4] of the feature points A1, A2, A3, and A4, a pixel on a straight line connecting the feature points and pixels in a predetermined range around the pixel belong to the class of the regions between each feature point. In the probability maps illustrated in FIG. 3, a portion has a high probability of being each feature point or each region between the feature points is represented by a black circle or a thick black line. In addition, the contour of the workpiece is represented by a dotted line, which is not included in the actual probability map, such that a positional relationship with the workpiece can be easily understood. Further, in FIG. 3, the probability maps indicating the feature points and the regions between the feature points are illustrated as different probability maps. However, the probabilities that the pixels will belong to the feature points and the regions between the feature points to be learned may be set on one probability map as long as the feature points and the regions between the feature points can be set to be distinguished from each other.

The learning unit 210 generates a model that has learned the learning data created by the preprocessing unit 120 and stores the generated model as a trained model in the model storage unit 215. The model generated by the learning unit 210 may be, for example, a known encoder-decoder model using a convolutional neural network. This encoder-decoder model is composed of an encoder that extracts features from an image with a convolutional layer of the convolutional neural network and a decoder that receives the extracted features and outputs a probability map. For example, this model can be used to perform so-called segmentation (a process of estimating the class to which each pixel of the image data belongs) that receives image data as an input and estimates probability maps indicating feature points and regions between the feature points in the image data. The learning unit 210 according to this embodiment performs learning, using the image data obtained by imaging a workpiece as an input to the encoder-decoder model and the probability map of the feature points and the probability map indicating the positional relationship between the feature points created by the preprocessing unit 120 as an output, respectively. In the convolutional neural network, even when a receptive field of one layer is narrow, it is possible to obtain global information by stacking layers while performing down-sampling. Therefore, by constructing the encoder-decoder model using this, even if parts of the image data are locally indistinguishable from other positions, it becomes possible to estimate that the location corresponds to the feature point or a region between the feature points.

The image processing device 1 having the above-described configuration creates, on the basis of image data obtained by imaging a given workpiece, the model that has learned the feature points of the workpiece and the regions between the feature points in the image data. The image processing device 1 images the workpiece to be learned in various positions and attitudes in response to an instruction input to the robot 3 from the operator. Then, learning based on others in the captured image is repeated. A model created by learning based on a certain number of image data can be used to perform a segmentation process that recognizes the feature points of the workpiece and the regions between the feature points from the image data obtained by imaging the workpiece.

Figure 4:
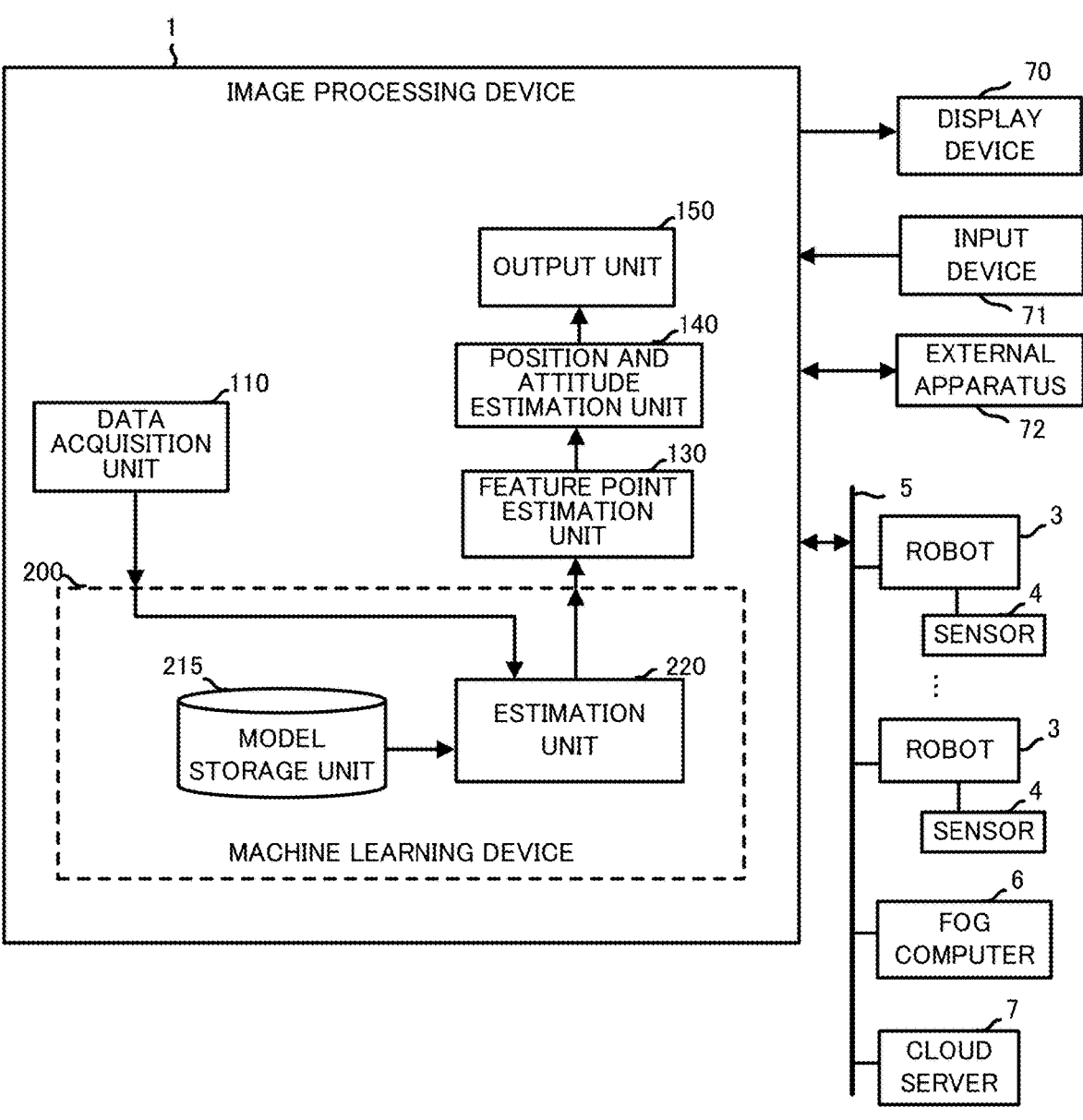
FIG. 4 is a block diagram illustrating schematic functions of an image processing device according to a second embodiment of the invention.

FIG. 4 is a schematic block diagram illustrating functions of an image processing device 1 according to a second embodiment of the invention. The image processing device 1 according to this embodiment estimates the position and attitude of a workpiece in image data, using a created trained model. The CPU 11 included in the image processing device 1 and the processor 201 included in the machine learning device 200 illustrated in FIG. 1 execute the system program to control the operation of each unit of the image processing device 1 and the machine learning device 200, thereby implementing each function of the image processing device 1 according to this embodiment.

The image processing device 1 according to this embodiment includes a data acquisition unit 110, a feature point estimation unit 130, a position and attitude estimation unit 140, an output unit 150, and an estimation unit 220. In addition, a model storage unit 215, which is an area storing the trained model that is a model generated as a result of machine learning based on the image data of the workpiece, is secured in advance on the RAM 203 or the non-volatile memory 204 of the machine learning device 200.

The data acquisition unit 110 acquires the image data of the workpiece captured by the sensor 4 of the robot 3. For example, the data acquisition unit 110 may acquire the image data of the workpiece from the robot 3 through the network 5. In addition, the data acquisition unit 110 may acquire the image data of the workpiece captured in advance from the external apparatus 72. The image data of the workpiece acquired by the data acquisition unit 110 according to this embodiment may include an image of a plurality of workpieces. The data acquisition unit 110 outputs the acquired image data to the machine learning device 200.

The estimation unit 220 performs a process of estimating the feature points of each workpiece and the regions between the feature points in the image data using the model stored in the model storage unit 215 on the basis of the image data acquired by the data acquisition unit 110. Then, the estimation unit 220 outputs a result of the estimation process to the feature point estimation unit 130. The model, which has been trained by the image processing device 1 according to the first embodiment with the feature points of the workpiece in the image data and the regions between the feature points, is stored in the model storage unit 215 in advance. When the image data acquired by the data acquisition unit 110 is input to this model, the probability map indicating the probability that the pixels will belong to the classes of the feature points of the workpiece included in the image data and the probability that the pixels will belong to the classes of the regions between the feature points is output. The estimation unit 220 outputs the probability map as the result of estimating the feature points and the regions between the feature points.

Figure 5:
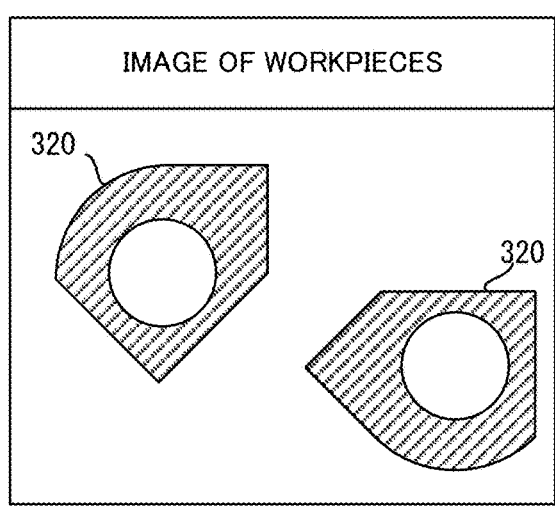
FIG. 5 is a diagram illustrating an example of a probability map indicating feature points estimated from image data and a probability map indicating regions between the feature points.
Figure 5:
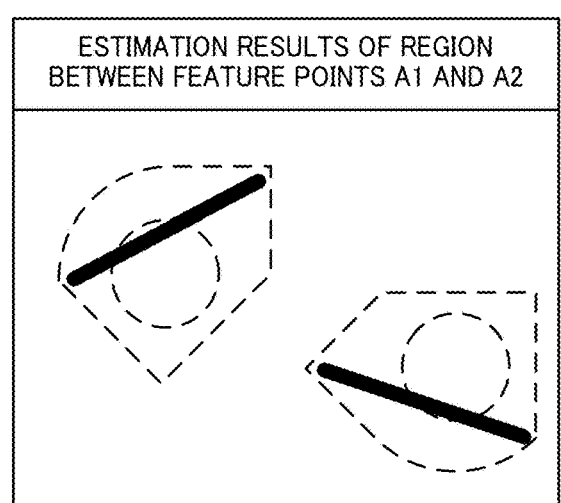
Figure 5:
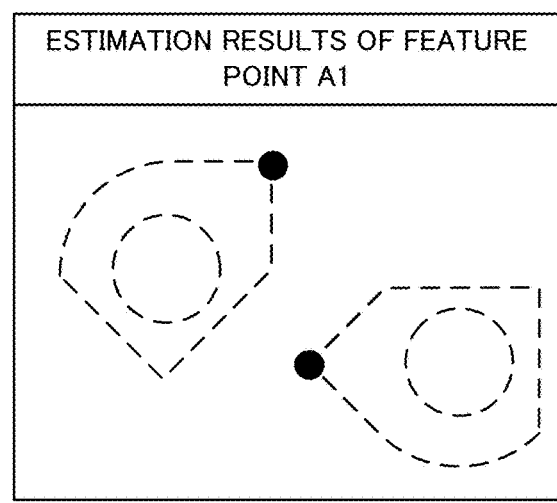
Figure 5:
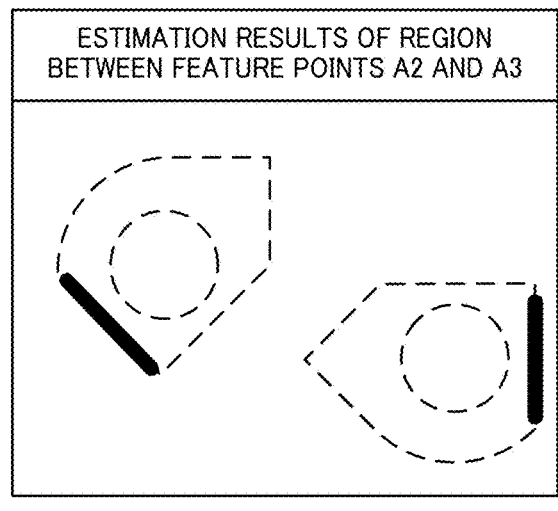
Figure 5:
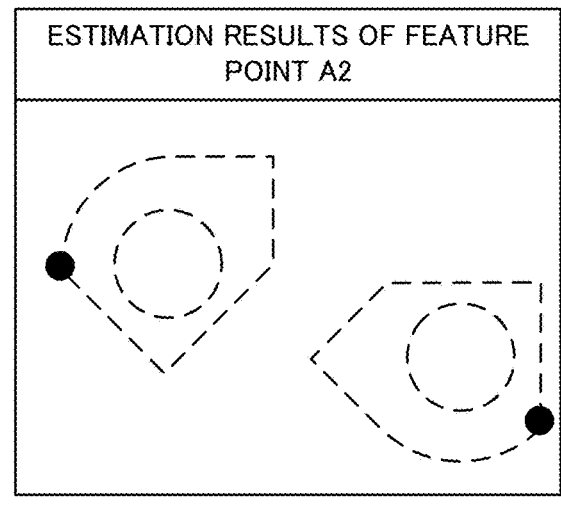
Figure 5:
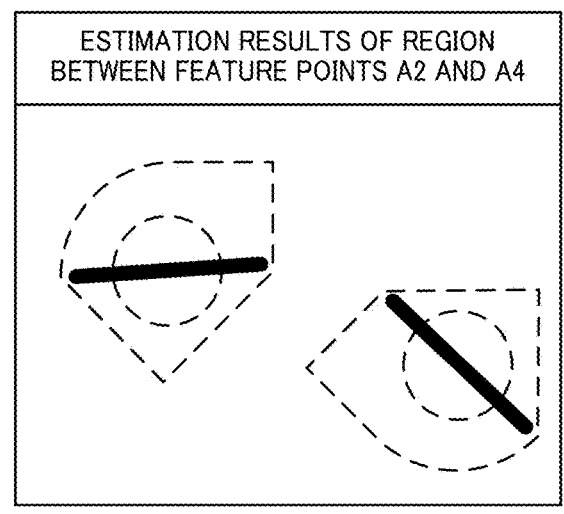

FIG. 5 is a diagram illustrating an example of the estimation results of the feature points of workpieces and the regions between the feature points included the image data by the estimation unit 220. In addition, it is assumed that the model that has learned the feature points of the workpieces and the regions between the feature points illustrated in FIG. 3 is stored in the model storage unit 215. As illustrated in FIG. 5, two workpieces 320 are included in the image of the workpieces in their positions and attitudes. In this case, the estimation unit 220 can estimate predetermined probability maps indicating the probability that each pixel will belong to the feature points of the workpieces 320 and the probability that each pixel will belong to the regions between the feature points. In addition, FIG. 5 illustrates the results of individually estimating the probability maps indicating the feature points and the regions between the feature points. However, in a case in which a model, which has been trained with data in which the probability that each pixel will belong to the feature points of the workpiece and the probability that each pixel will belong to the regions between the feature points have been set in one probability map, is used, one probability map in which the feature points and the regions between the feature points can be distinguished from each other is output as the estimation result.

The feature point estimation unit 130 estimates a feature point set for each workpiece on basis of the feature points of the workpieces and the regions between the feature points in the image data estimated by the estimation unit 220. The feature point estimation unit 130 assumes a region in which the probability map indicating each feature point estimated by the estimation unit 220 and the probability map indicating the region between the feature points are superimposed. For this, a probability map in which the probability maps have actually been superimposed may be created. Alternatively, since the positions of the pixels in the probability maps correspond to each other, a probability map in which the probability maps have been virtually superimposed may be assumed, and the subsequent process may be performed.

Then, the feature point estimation unit 130 creates combinations of the feature points on the superimposed probability map. Combinations of all of the feature points may be created. In addition, sets of each feature point and predetermined number of N feature points in the vicinity of the feature point may be created. Alternatively, sets of feature points within a predetermined distance that is determined according to the size of the workpiece may be created. Then, the feature point estimation unit 130 calculates the average value of the probabilities that pixels on a straight line connecting the feature points forming the set will belong to the region between the feature points. At this time, the straight line connecting the feature points may be configured to have a predetermined width. Then, in a case in which the calculated average value of the probabilities that the pixels will belong to the region between the feature points is equal to or greater than a predetermined threshold value, it is estimated that the set of the feature points indicates the feature points of the same workpiece. In a case in which it is estimated that a certain feature point $\alpha 1$ and another feature point $\alpha 2$ indicate the feature points of the same workpiece and that the feature point $\alpha 1$ and still another feature point $\alpha 3$ indicate the feature points of the same workpiece, the feature point estimation unit 130 may estimate that all of the feature points $\alpha 1$ to $\alpha 3$ indicate the feature points of the same workpiece.

A process of the feature point estimation unit 130 will be described with reference to FIGS. 6A to 6C.

Figure 6A:
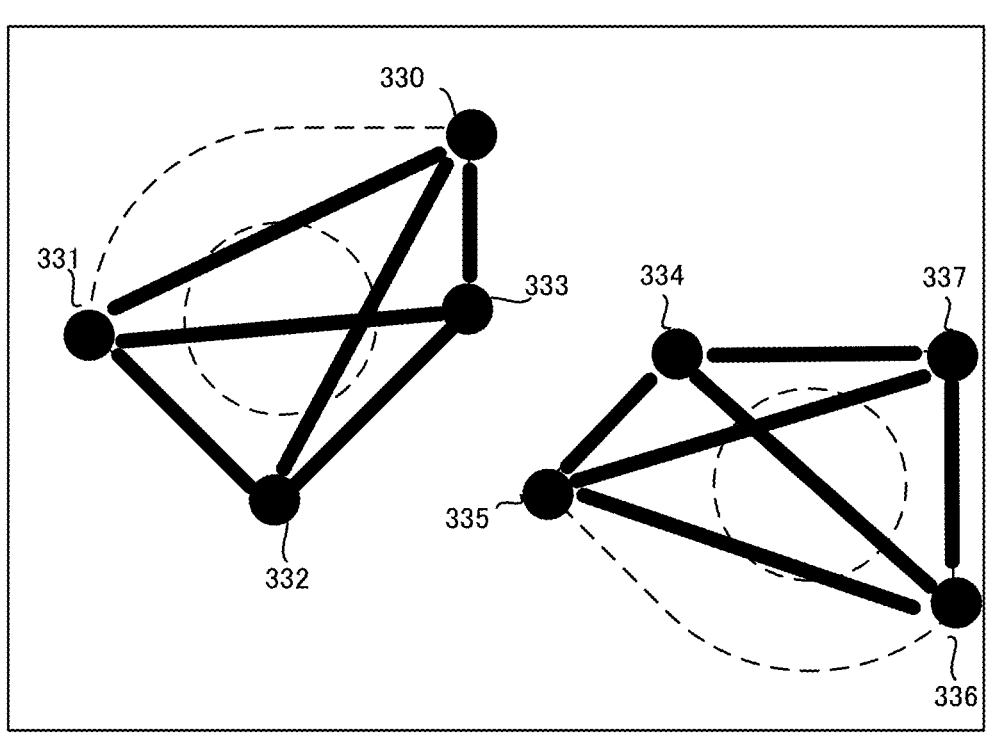
FIG. 6A is a diagram illustrating a process of a feature point estimation unit.
Figure 6B:
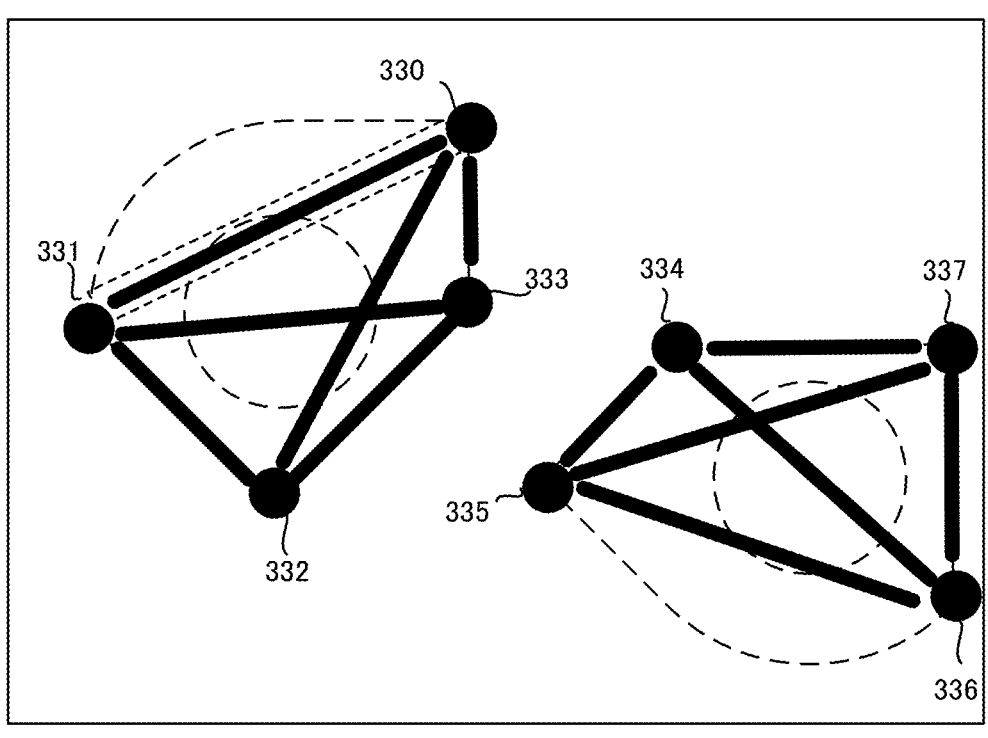
FIG. 6B is a diagram illustrating the process of the feature point estimation unit.
Figure 6C:
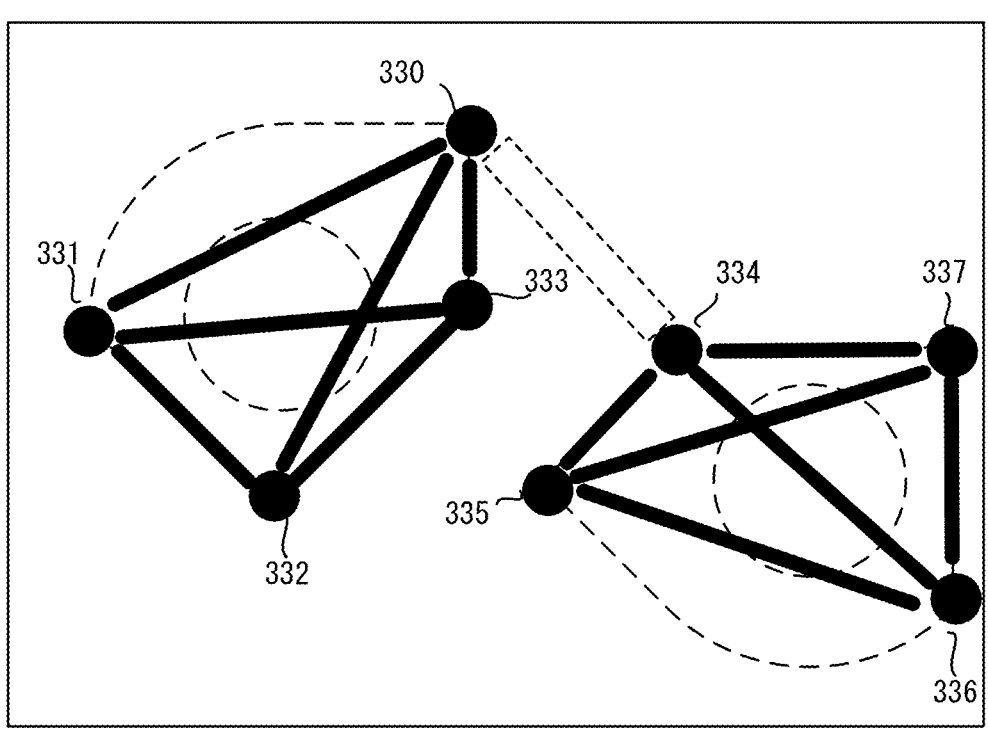
FIG. 6C is a diagram illustrating the process of the feature point estimation unit.

FIGS. 6A to 6C are diagrams illustrating an example in which the probability maps indicating the feature points and the probability maps indicating the regions between feature points are superimposed. In FIGS. 6A to 6C, a black circle indicates the feature point, and a thick black line indicates a portion estimated as the region between the feature points.

As can be understood from the display illustrated in FIG. 6A, while pixels between the feature points belonging to the same workpiece have a high probability of belonging to the region between the feature points, pixels between the feature points belonging to different workpieces have a low probability of belonging to the region between the feature points.

For example, as illustrated in FIG. 6B, attention is paid to a region between a feature point 330 and a feature point 331. In FIG. 6B, this region is represented by a dotted line frame. For pixels in this frame, the percentage of pixels having a high probability of belonging to the region between the feature points is high. The feature point estimation unit 130 calculates the average value of the probabilities (the sum of probability values divided by the number of pixels or the area) that the pixels in the frame will belong to the region between the feature points. Then, since the average value of the probabilities equal to or greater than a predetermined threshold value is calculated, the feature point estimation unit 130 estimates that the feature point 330 and the feature point 331 are feature points of the same workpiece. Similarly, in a case in which it is estimated that a set of the feature point 330 and the feature point 332 and a set of the feature point 330 and a feature point 333 are feature points of the same workpiece, the feature point estimation unit 130 estimates that all of the feature points 330 to 333 are feature points of the same workpiece. In addition, the region between the feature points may be recognized entirely or partially. In consideration of this case, it is desirable to set a threshold value for a balance with the case of erroneous recognition.

On the other hand, as illustrated in FIG. 6C, attention is paid to a region between the feature point 330 and a feature point 334. In FIG. 6C, this region is represented by a dotted line frame. For pixels in this frame, the percentage of pixels having a low probability of belonging to the region between the feature points is high. The feature point estimation unit 130 calculates the average value of the probabilities (the sum of probability values divided by the number of pixels or the area) that the pixels in the frame will belong to the region between the feature points. Then, since the average value of the probabilities less than a predetermined threshold value is calculated, the feature point estimation unit 130 estimates that the feature point 330 and the feature point 331 are feature points of different workpieces.

The position and attitude estimation unit 140 estimates the position and attitude of each workpiece included in the image data on the basis of the sets of the feature points of the same workpiece estimated by the feature point estimation unit 130. The position and attitude estimation unit 140 may perform, for example, a matching process between the feature points estimated as the feature points of the same workpiece and the feature points in a shape model of the workpiece stored in advance to specify the position and attitude of the workpiece. Even in a case in which some feature points of the same workpiece are not estimated, the position and attitude estimation unit 140 may estimate that each workpiece exists in its position and attitude when the feature points are matched at a predetermined matching rate or higher.

The output unit 150 outputs the position and attitude of each workpiece estimated by the position and attitude estimation unit 140. For example, the output unit 150 may instruct the display device 70 to display and output the estimation result of the position and attitude of each workpiece. In addition, for example, the output unit 150 may transmit and output the estimation result of the position and attitude of each workpiece to the robot 3 through the network 5. Further, for example, the output unit 150 may output the estimation result of the position and attitude of each workpiece to be stored in the non-volatile memory 14 and to be stored in an external memory through the external apparatus 72.

In the image processing device 1 having the above-described configuration, it is possible to estimate the feature points belonging to the same workpiece in the captured image data and to estimate the positions and attitudes of a plurality of workpieces. The image processing device 1 according to this embodiment can partially recognize each of the feature points and the regions between the feature points. Therefore, even in a situation in which it is difficult to recognize each workpiece as a whole due to factors, such that the appearance of the workpiece in the captured image is not uniform, the contour of the workpiece is difficult to see, or the workpiece is easily misrecognized, when some of the feature points or some of the regions between the feature points can be recognized, the feature point estimation unit 130 can perform further estimation with combinations of them to increase the degree of recognition of the workpiece. In addition, since the regions between the feature points are recognized, it is possible to estimate the relationship between the feature points with a relatively high probability even in an environment in which a plurality of workpieces are mixed and in a situation in which the feature points can only be partially recognized as described above. Furthermore, it has been found that the estimation of the regions between the feature points is less likely to be affected by a surface condition of the workpiece. It is considered that this is because the feature points and the regions between the feature points are estimated together, incorporating the features seen in the regions between the feature points and both ends as the feature points as conditions. Therefore, for example, when a label or a packing tape attached to a surface of a corrugated cardboard box is present between the feature points, it is possible to suppress the influence of the label or the packing tape and to perform the estimation.

In addition, in the above-described example of the operation, an example in which the feature points of the workpiece can be individually distinguished has been described. However, even in a case in which it is not possible to distinguish feature points from the shape of a workpiece, such as a rectangular workpiece, it is possible to learn the feature points and the regions between the feature points and to estimate the position and attitude of the workpiece.

Figure 7:
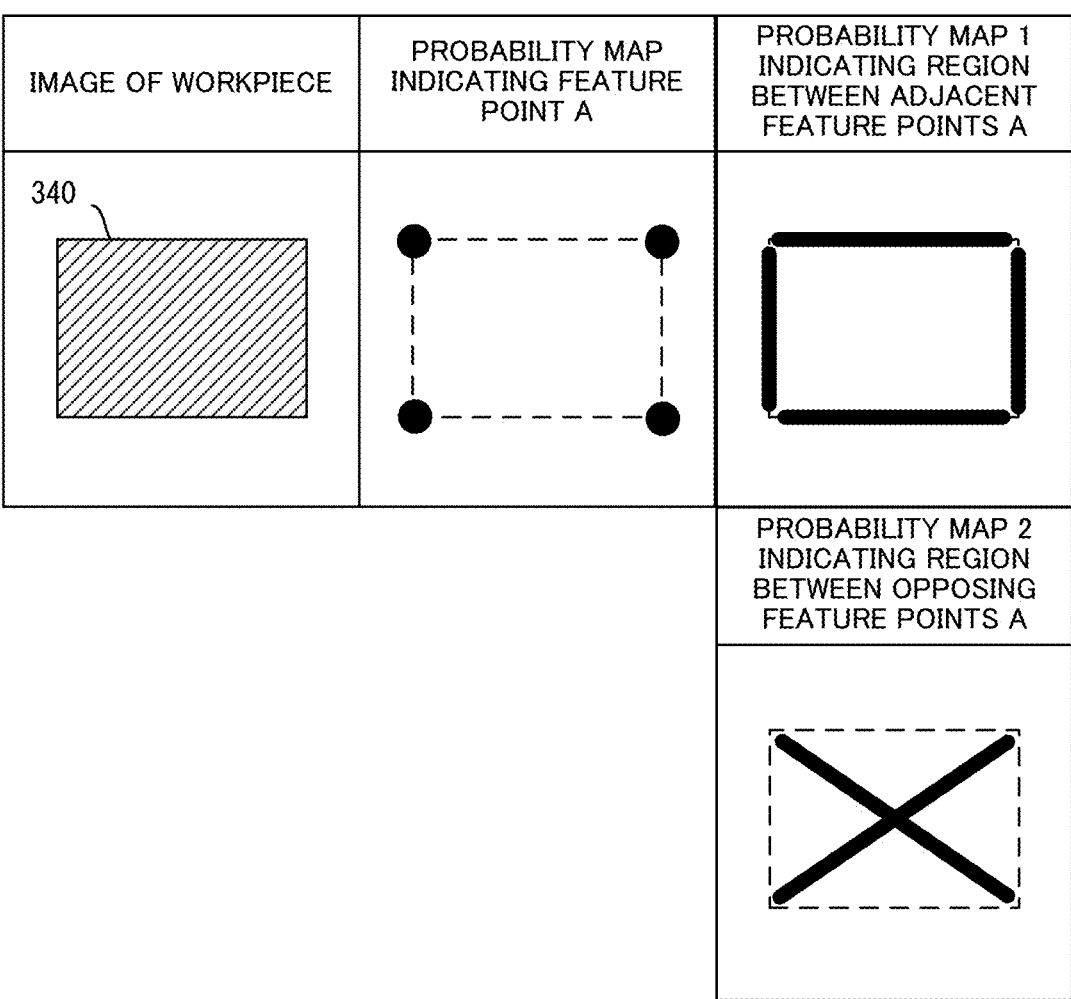
FIG. 7 is a diagram illustrating another example of the probability map indicating the feature points and the probability map indicating the regions between the feature points.

FIG. 7 is a diagram illustrating an example of a probability map indicating feature points of a rectangular workpiece and a probability map indicating a region between the feature points. As illustrated in FIG. 7, a rectangular workpiece 340 has at least four vertices, and it is possible to specify the position and attitude of the workpiece, using at least the vertices as the feature points. In addition, since the shape of the workpiece 340 does not change even when the workpiece 340 is rotated vertically and horizontally, the feature points of each workpiece cannot be distinguished. Therefore, a probability map is created in which the probability that pixels in a predetermined range having, as the center, a pixel at a position corresponding to each of the vertices of the workpiece 340 in the image data will belong to the class of a feature point A is high. In addition, a probability map is created in which pixels on a straight line connecting the feature points at adjacent positions on the contour of the workpiece and pixels in a predetermined range around the pixels belong to the class of the region between the feature points. Furthermore, separately from this, a probability map is created in which pixels on a straight line connecting the feature points at opposing positions and pixels in a predetermined range around the pixels belong to the class of the region between the feature points.

A case is considered in which the position and attitude of a workpiece are estimated using a trained model that has been trained using the image of the workpiece and the probability maps.

Figure 8:
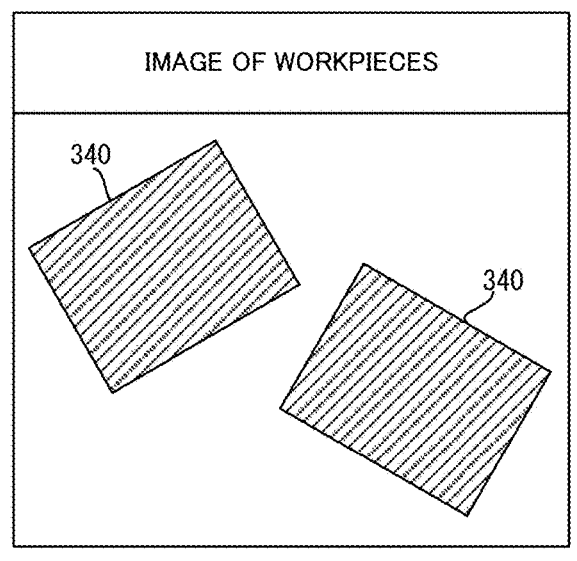
FIG. 8 is a diagram illustrating another example of the probability map indicating the feature points estimated from the image data and the probability map indicating the regions between the feature points.
Figure 8:
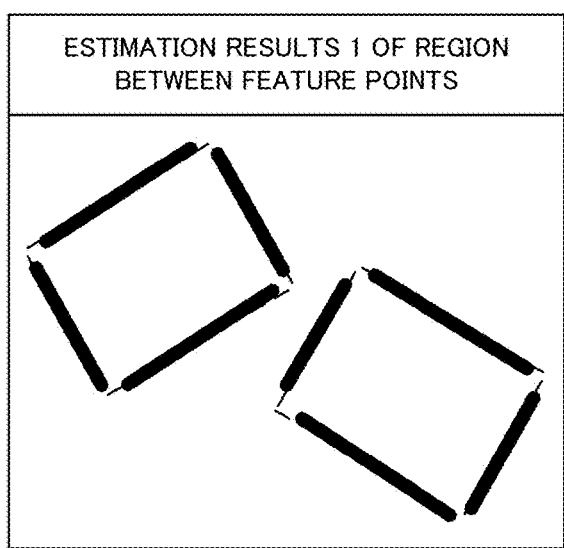
Figure 8:
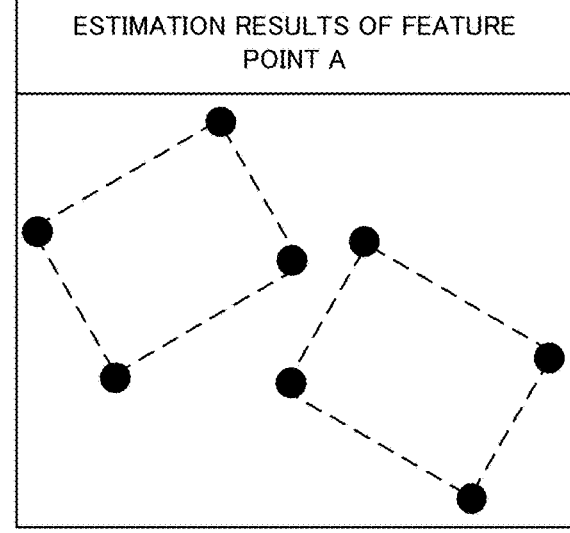
Figure 8:
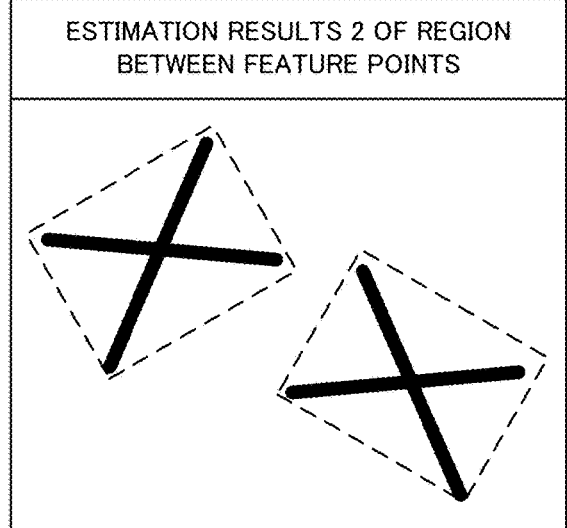
Figure 9:
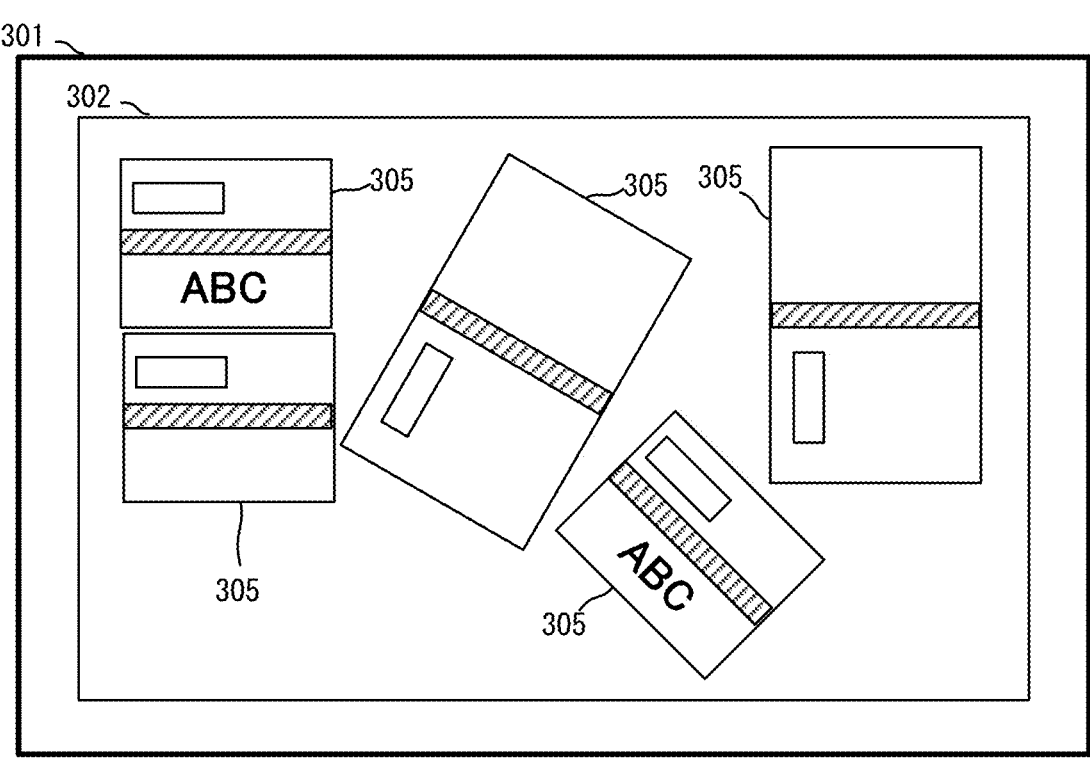
FIG. 9 is a diagram illustrating an example of recognition of workpieces on a pallet according to the prior art.
Figure 9:
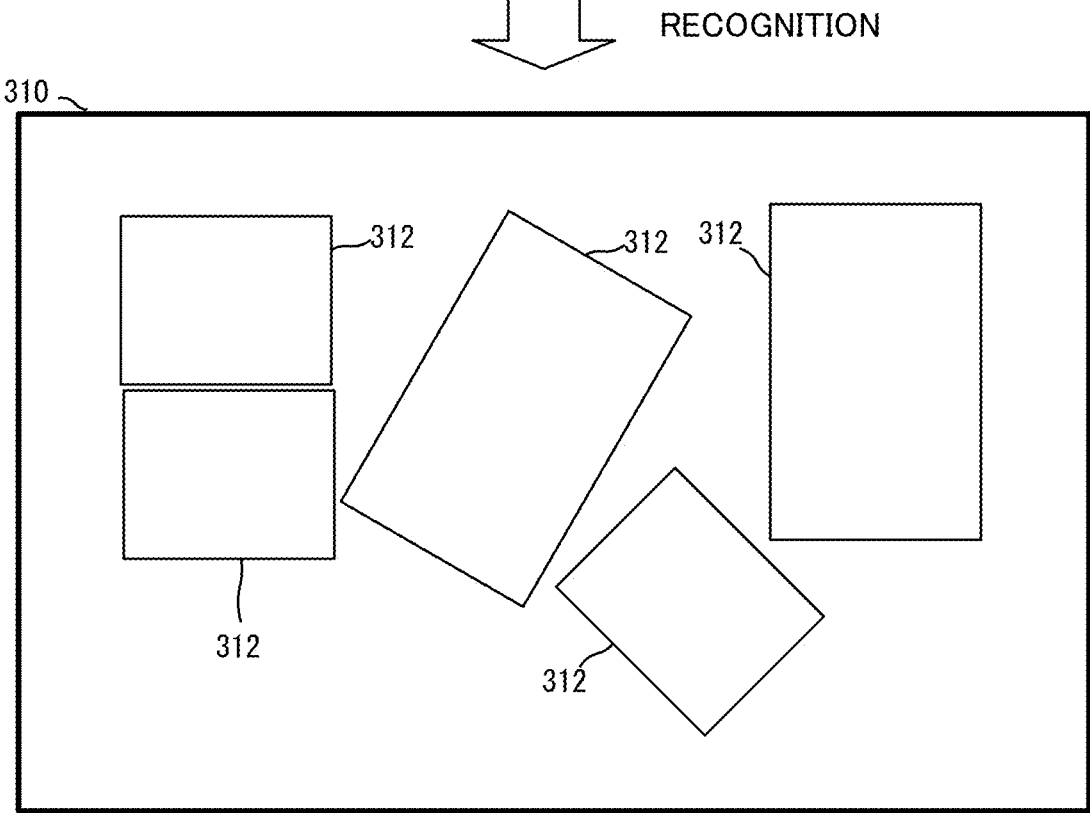
Figure 10:
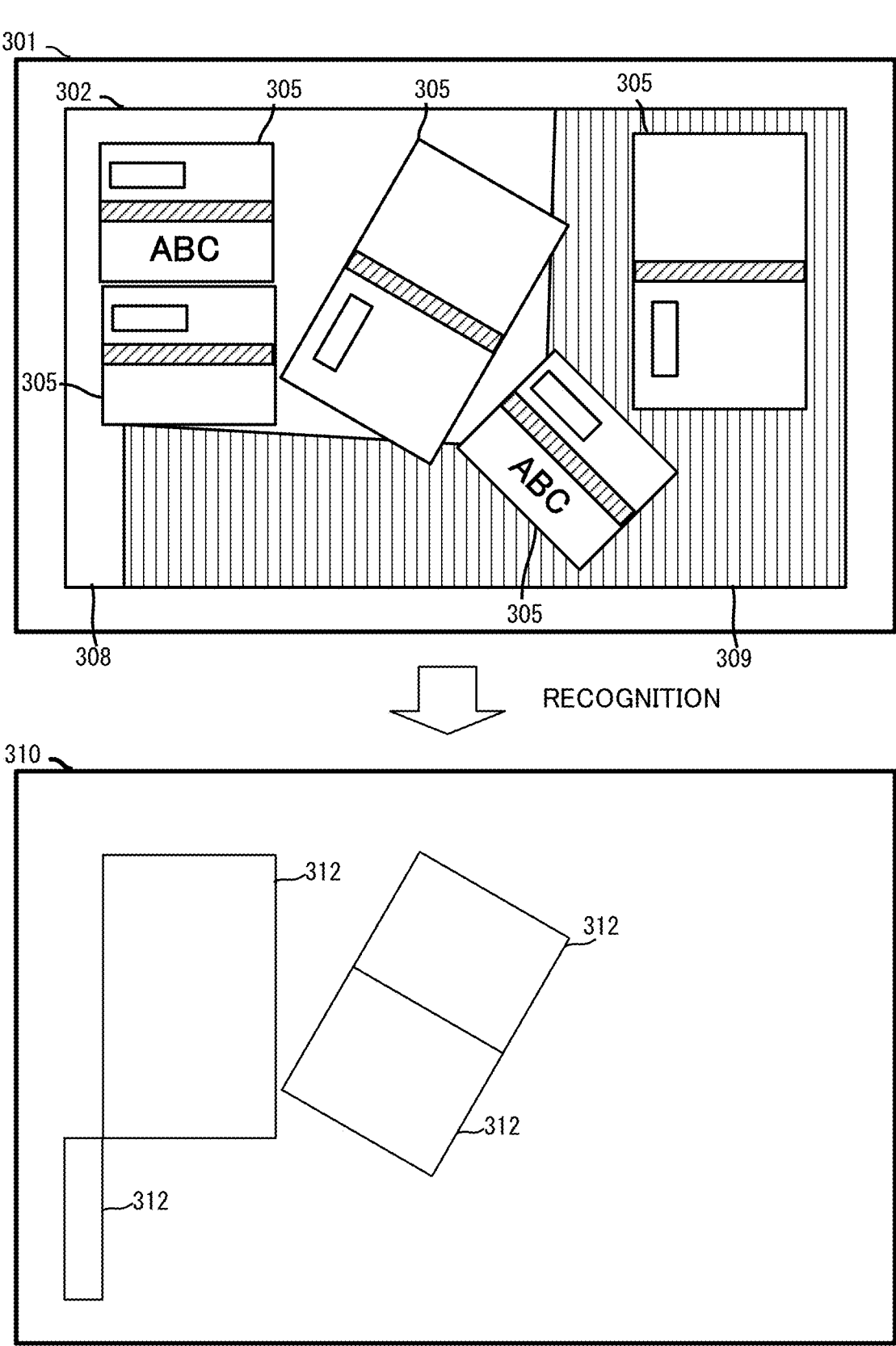
FIG. 10 is a diagram illustrating a problem of the recognition of the workpieces on the pallet according to the prior art.

FIG. 8 is a diagram illustrating an example of the estimation results of feature points of rectangular workpieces included in an image and regions between the feature points. In addition, it is assumed that the model storage unit 215 stores a model that has learned the feature points of the workpiece and the regions between the feature points illustrated in FIG. 7. As illustrated in FIG. 8, two workpieces 340 are included in an image of the workpieces in their positions and attitudes. Even in this case, the estimation unit 220 can estimate a predetermined probability map indicating the probability that each pixel will belong to the feature points of the workpiece 340 and the probability that each pixel will belong to the regions between the feature points. Then, the feature point estimation unit 130 can estimate the feature points of the same workpiece on the basis of this estimation result, and the position and attitude estimation unit 140 can estimate the position and attitude of each workpiece in the image data on the basis of the estimation result.

The embodiments of the invention have been described above. However, the invention is not limited only to the above-described examples of the embodiments and can be implemented in various aspects by adding appropriate modifications.

Figure 11:
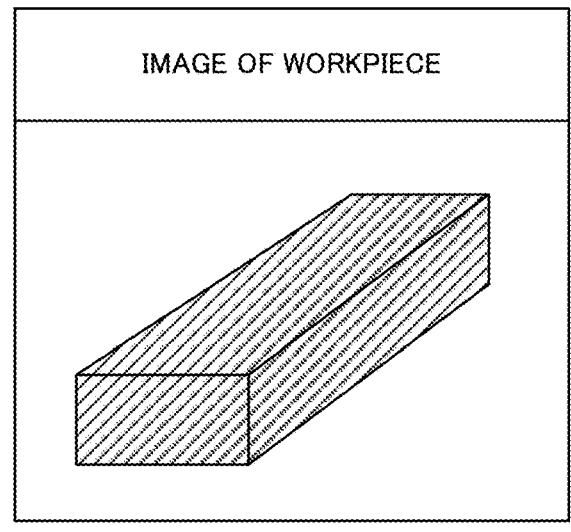
FIG. 11 is a diagram illustrating an example of a probability map indicating feature points of a three-dimensional workpiece and a probability map indicating regions between the feature points.
Figure 11:
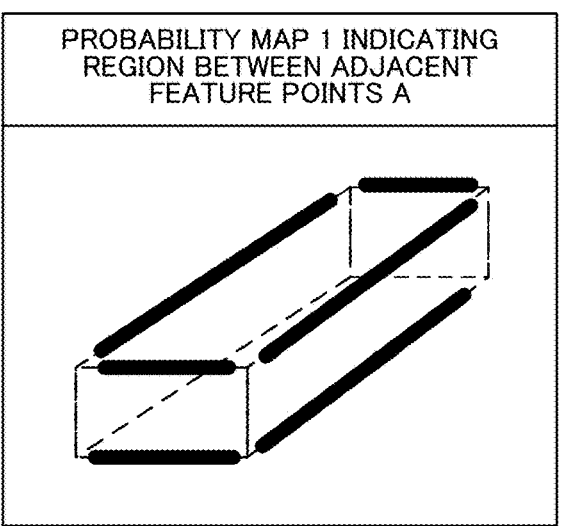
Figure 11:
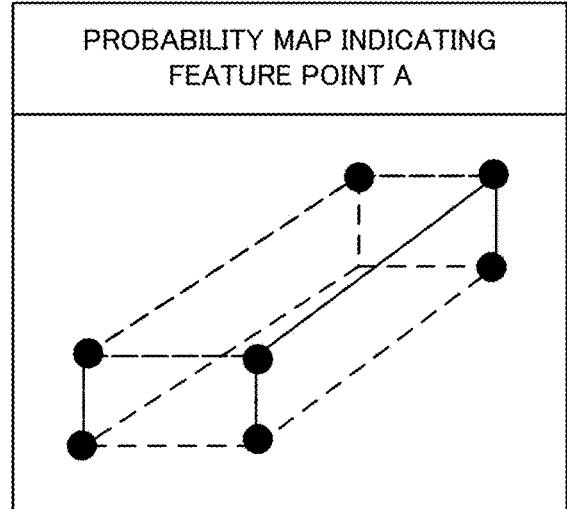
Figure 11:
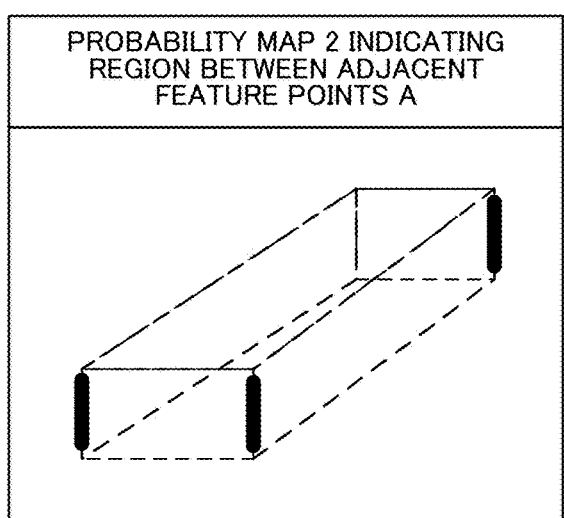
Figure 11:
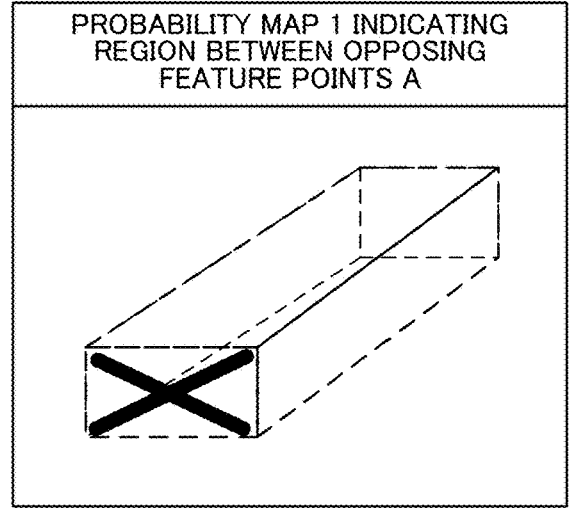

For example, in the above-described embodiments, a case in which image data obtained by imaging a workpiece is understood on a two-dimensional plane has been described as an example. However, a distance image sensor that can capture a depth direction may be used as the sensor 4 such that the position and attitude of the workpiece are not estimated in two dimensions (x, y, $\theta$), but are estimated in 2.5 dimensions (x, y, z, $\theta$) or in three dimensions (x, y, z, $\theta_x$, $\theta_y$, $\theta_z$). In this case, as illustrated in FIG. 11, each function may be configured to perform the same process as described above, considering that image data is disposed in a three-dimensional space.

EXPLANATIONS OF LETTERS OR NUMERALS

1 IMAGE PROCESSING DEVICE
3 ROBOT
4 SENSOR
5 NETWORK
6 FOG COMPUTER
7 CLOUD SERVER
11 CPU
12 ROM
13 RAM
14 NON-VOLATILE MEMORY
15, 17, 18, 20, 21 INTERFACE
22 BUS
70 DISPLAY DEVICE
71 INPUT DEVICE
72 EXTERNAL APPARATUS
110 DATA ACQUISITION UNIT
120 PREPROCESSING UNIT
130 FEATURE POINT ESTIMATION UNIT
140 POSITION AND ATTITUDE ESTIMATION UNIT
150 OUTPUT UNIT
200 MACHINE LEARNING DEVICE
201 PROCESSOR
202 ROM
203 RAM
204 NON-VOLATILE MEMORY
210 LEARNING UNIT
215 MODEL STORAGE UNIT
220 ESTIMATION UNIT
301 IMAGE
302 PALLET
305 CORRUGATED CARDBOARD BOX
310 RESULTING IMAGE
312 RECOGNIZED IMAGE
320 WORKPIECE
330 to 337 FEATURE POINT

The invention claimed is:

1. An image processing device for generating a machine learning model used to estimate a position and attitude of a workpiece from within image data, on the basis of the image data obtained by imaging the workpiece, the image processing device comprising:

a data acquisition unit configured to acquire image data obtained by imaging a workpiece;

a preprocessing unit configured to create a first probability map indicating feature points of the workpiece in the image data and a second probability map indicating regions between the feature points on the basis of the image data acquired by the data acquisition unit;

a learning unit configured to generate a model of machine learning for estimating the first probability map and the second probability map from the image data on the basis of the image data, the first probability map, and the second probability map; and a model storage unit configured to store the model created by the learning unit.

2. An image processing device for estimating a position and attitude of a workpiece from within image data obtained by imaging the workpiece, the image processing device comprising:

a model storage unit configured to store a model for estimating a first probability map indicating feature points of a workpiece in image data and a second probability map indicating regions between the feature points from the image data obtained by imaging the workpiece;

a data acquisition unit configured to acquire image data obtained by imaging at least one workpiece;

an estimation unit configured to estimate a first probability map and a second probability map, using the model stored in the model storage unit, on the basis of the image data acquired by the data acquisition unit;

a feature point estimation unit configured to estimate feature points of the same workpiece in the image data on the basis of the first probability map and the second probability map;

a position and attitude estimation unit configured to estimate a position and attitude of the workpiece in the image data on the basis of a result estimated by the feature point estimation unit; and an output unit configured to output a result estimated by the position and attitude estimation unit.

3. A non-transitory storage medium storing a program causing a computer to function as an image processing device for generating a machine learning model used to estimate a position and attitude of a workpiece in image data obtained by imaging the workpiece on the basis of the image data, the program causing the computer to function as:

a data acquisition unit configured to acquire image data obtained by imaging a workpiece;

a preprocessing unit configured to create a first probability map indicating feature points of the workpiece in the image data and a second probability map indicating regions between the feature points on the basis of the image data acquired by the data acquisition unit;

a learning unit configured to generate a machine learning model for estimating the first probability map and the second probability map from the image data on the basis of the image data, the first probability map, and the second probability map; and a model storage unit configured to store the model created by the learning unit.

4. A non-transitory storage medium storing a program causing a computer to function as an image processing device for estimating a position and attitude of a workpiece in image data obtained by imaging the workpiece, the program causing the computer to function as:

a model storage unit configured to store a model for estimating a first probability map indicating feature points of a workpiece in image data and a second probability map indicating regions between the feature points from the image data obtained by imaging the workpiece;

a data acquisition unit configured to acquire image data obtained by imaging at least one workpiece;

an estimation unit configured to estimate a first probability map and a second probability map, using the model stored in the model storage unit, on the basis of the image data acquired by the data acquisition unit;

a feature point estimation unit configured to estimate feature points of the same workpiece in the image data on the basis of the first probability map and the second probability map;

a position and attitude estimation unit configured to estimate a position and attitude of the workpiece in the image data on the basis of a result estimated by the feature point estimation unit; and an output unit configured to output a result estimated by the position and attitude estimation unit.

\* \* \* \* \*